(12) United States Patent
Faruque

(10) Patent No.: US 8,113,555 B2
(45) Date of Patent: Feb. 14, 2012

(54) VEHICLE IMPACT MITIGATION SYSTEM

(75) Inventor: Omar Faruque, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 309 days.

(21) Appl. No.: 12/545,468

(22) Filed: Aug. 21, 2009

(65) Prior Publication Data

US 2011/0042975 A1    Feb. 24, 2011

(51) Int. Cl.
*B60R 19/40* (2006.01)
(52) U.S. Cl. .............. 293/118; 293/5; 293/119
(58) Field of Classification Search .......... 293/2, 4, 293/5, 10, 118, 119
See application file for complete search history.

(56) References Cited

U.S. PATENT DOCUMENTS

| | | | |
|---|---|---|---|
| 2,628,118 A * | 2/1953 | Gunnels, Jr. | 293/119 |
| 2,873,994 A * | 2/1959 | Omps | 293/134 |
| 3,947,061 A * | 3/1976 | Ellis | 293/5 |
| 5,460,421 A | 10/1995 | Culbertson | |
| 5,967,573 A | 10/1999 | Wang | |
| 6,019,419 A | 2/2000 | Browne et al. | |
| 6,302,458 B1 | 10/2001 | Wang | |
| 6,334,639 B1 | 1/2002 | Vives et al. | |
| 6,401,565 B1 | 6/2002 | Wang | |
| 6,709,035 B1 | 3/2004 | Namuduri | |
| 6,773,044 B2 | 8/2004 | Schambre | |
| 6,820,924 B2 | 11/2004 | Caliskan et al. | |
| 6,834,898 B2 | 12/2004 | Wang | |
| 6,976,565 B2 | 12/2005 | Meernik | |
| 6,976,718 B2 | 12/2005 | Nakanishi | |
| 7,034,668 B2 | 4/2006 | Engelnman et al. | |
| 7,347,465 B2 * | 3/2008 | Jayasuriya et al. | 293/118 |
| 7,909,373 B2 * | 3/2011 | Donovan | 293/119 |
| 2003/0132666 A1 * | 7/2003 | Bond et al. | 303/193 |
| 2007/0040414 A1 | 2/2007 | Frederick et al. | |

* cited by examiner

*Primary Examiner* — Dennis Pedder
*Assistant Examiner* — Jason S Daniels
(74) *Attorney, Agent, or Firm* — Fredrick V. Owens; Kristy J. Downing; Just Intellectuals, PLLC

(57) ABSTRACT

The present disclosure relates to a vehicle impact mitigation system. The impact mitigation system can be configured to mitigate front impact situations. A main rail and an extendable rail—configured to move with respect to the main rail—are provided. A front module is attached to the extendable rail and attachable to the main rail. A spring is positioned between the front module and main rail, the spring is configured to apply a force to the front module when the front module is detached from the main rail. An actuator is configured to control attachment of the front module to the main rail.

19 Claims, 12 Drawing Sheets

VEHICLE IMPACT MITIGATION SYSTEM

TECHNICAL FIELD

The present disclosure relates to vehicle impact mitigation systems. Vehicle modules are configured to deploy in anticipation of vehicle impact. Locking mechanisms for use with various impact mitigation systems are also discussed herein.

BACKGROUND

Vehicle impact mitigation systems were developed to assist in reducing the intrusion of other vehicles and/or unwanted vehicle components into the passenger cabin of the vehicle during crash. Contemporary vehicles include front, side and overhead crash protection systems. Severe front impact situations can lead to the engine and its components intruding the passenger compartment. Past crash protection systems have included various designs that are inferior to the present invention.

For example, traditionally the front end structure of the vehicle consists of a bumper module, side rail and upper side rail (or "shotgun"). The side rail provides the primary energy absorption for the front end structure often absorbing as much as 80% of the impact energy. Accordingly, the length of the side rail is directly related to its energy absorption capabilities. The longer the side rail, the more energy it can absorb. In vehicles having a short front overhang, however, the crushable length of the side rail can be significantly shortened.

Some modern vehicles have sought to increase the length of the side rail in impact scenarios to provide additional crash space, as needed, during a crash. While the existing extendable rails and bumpers have provided flexibility in the design of the front end structure of these vehicles, the means of extending these rails can be improved. Some vehicles utilize a pyrotechnic system to deploy the bumper. However, the Applicant has found that these systems can cause heat damage during deployment and are not designed for multiple usages.

Other systems utilize electric motors to extend the front end structure, such as U.S. Pat. No. 6,773,044 titled "Active Vehicle Front Structure for Energy Management" to Schambre et al. Such electric motor based systems are slower than pyrotechnic systems and typically require more time than that which is desirable for deployment. To compensate, electric motor based systems generally extend the front end structure during regular driving speeds and retract the front end when the engine is stopped. This alters the look of the vehicle during normal driving conditions and is very undesirable from a styling point-of-view. In the alternative, some electric motor based systems rely on pre-crash sensing data for deployment but typically these systems do not respond as quickly as is desired. Where more powerful motors are utilized to expedite deployment, the size of the motor can present significant packaging and weight issues for the vehicle.

Additionally, once deployed the front module can be reinforced or locked into place using a locking feature. One locking feature is disclosed in U.S. Pat. No. 6,019,419 titled "Vehicle Rail Crush Control System and Method" to Browne et al. Disclosed therein are circumferentially-spaced, rotatable wedge members that move radially outward by actuation to lock the extended bumper in place. This design requires a rotatable arm for the wedges and multiple points of rotation for each wedge. Though this design reinforces the front module in the extended position, this design presents a more costly and unnecessarily complicated approach to locking the front module.

Therefore, it is desirable to provide a vehicle impact mitigation system with a rapidly deployable front end module. It would be beneficial to have a system that utilizes a mechanical deployment means that is resettable. Moreover, it is desirable to have a more cost effective locking mechanism for the system to secure the front module in the extended position after deployment.

SUMMARY

The present inventions may address one or more of the above-mentioned issues. Other features and/or advantages may become apparent from the description which follows.

According to one exemplary embodiment, a vehicle impact mitigation system, includes a main rail; an extendable rail, configured to move with respect to the main rail; a front module attached to the extendable rail; a spring between the front module and main rail, the spring configured to apply a force to the front module when the front module is detached from the main rail; an actuator configured to control attachment of the front module to the main rail; and a locking mechanism configured to restrain the extendable rail in an extended position after the front module is deployed, the locking mechanism including either: (i) a locking cavity formed in the extendable rail and a spring-loaded deadbolt configured to engage the locking cavity; or (ii) a guide sleeve on the extendable rail having at least one locking wedge that abuts a rigid plate when moved into a locking position.

In another exemplary embodiment a vehicle includes a front module configured to move away from the vehicle in anticipation of a vehicle impact; a fastening system configured to selectively attach the front module to a vehicle structural member; a crash control module configured to deploy the front module under a predetermined condition; and a vehicle braking system linked to the crash control module. The predetermined condition is a vehicle braking condition. The crash control module is configured to supply a vehicle braking fluid to the fastening system to actuate the fastening system when the predetermined condition is met.

In yet another exemplary embodiment, a control circuit for controlling vehicle components in impact conditions is provided, the circuit includes: an actuator configured to control attachment of a spring-mounted front module to a vehicle; a hydraulic cylinder configured to apply a force to the front module when actuated; and a control module linked to a vehicle braking system, configured to control the actuator and the hydraulic cylinder according to vehicle braking conditions.

One of the advantages of the present disclosure is that it teaches timely, yet mechanical, deployment of a front end module of a vehicle. The use of a spring-mounted front end module, for example, saves on weight, part costs, packaging space and presents a resettable option for front end deployment. Deployment of the front end module is based solely on pre-compressed springs and momentum differences. It does not require any pyrotechnic system or electric motor to accomplish deployment.

Another advantage of the teachings in the present disclosure is that the impact mitigation system utilizes radar based collision mitigation by braking (or CMbB). Sensors are utilized that can detect imminent crashing events; modern electronic braking technology is also utilized. Deployment of the front end module is triggered with pre-crash activating features such as electronic braking and pre-activated restraint systems. The system minimizes the chance of false alarms.

Another advantage of the present disclosure is that there is discuss herein the use of a vehicle braking system to both initiate and power deployment of the front end module.

Another advantage of the present disclosure is that it provides several cost-efficient locking mechanisms that assist in securing the front end module in a deployed position.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same reference numbers are used in the figures for identical or essentially identical elements. The above features and advantages and other features and advantages of the present invention are readily apparent from the following detailed description of the best modes for carrying out the invention when taken in connection with the accompanying drawings. In the figures:

DETAILED DESCRIPTION

Figure 1:
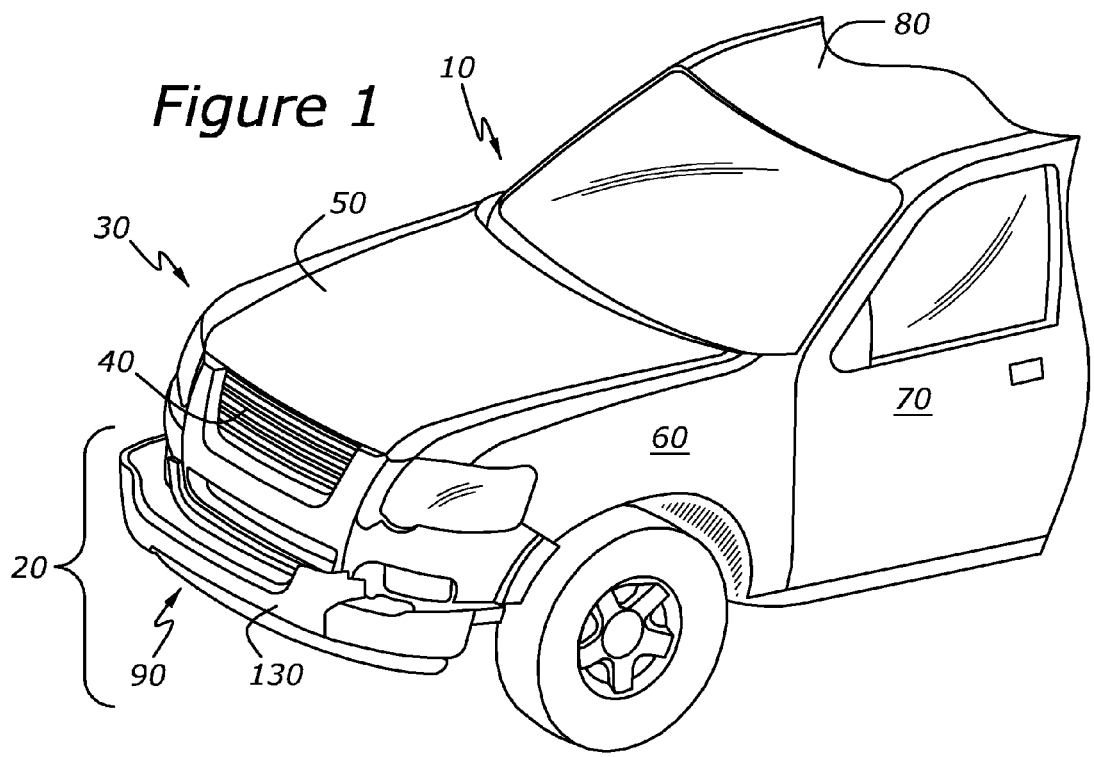
FIG. 1 is a perspective view of a front portion of a vehicle having an impact mitigation system in an extended position according to an exemplary embodiment of the present invention.

Referring to the drawings, FIGS. 1-19, wherein like characters represent the same or corresponding parts throughout the several views there is shown various vehicle impact mitigation systems. The illustrated impact mitigation systems employ mechanical features to deploy a front module of a vehicle. Such mechanical features, e.g., spring-mounting the front module to a vehicle, are the primary propellants of the front module to move the module forward or away from the vehicle. The illustrated impact mitigation systems reduce the intrusion of vehicle components or foreign items into the passenger cabin during front crash scenarios. Impact mitigation systems extend or deploy the front bumper of the vehicle and extend the main or side rail, thereby increasing crash space. An increased crash space allows more crash energy absorption and thereby reduces peak deceleration levels. Reducing the deceleration level helps mitigate occupant injuries. Impact mitigation systems can be utilized with different vehicle types, including but not limited to sports utility vehicles, sedans, coupes, trucks, and all utility vehicles. These mechanical features can be utilized with electric, hydraulic, chemical and/or pyrotechnic means that assist in deploying the front module.

While the illustrated embodiments relate to impact mitigation systems for a front end of a vehicle, other impact mitigation systems for the side, rear, overhead and/or floor are considered to be within the scope of the present invention. In each case side, rear, overhead and/or floor modules, respectively, can be utilized to reduce the intrusion of vehicle components or foreign items into the passenger cabin during crash scenarios.

The present invention may be adapted and applied to various sensing systems including: collision warning systems, threat level identification and quantifying systems, collision avoidance systems, parking-aid systems, reversing-aid systems, passive countermeasure systems, adaptive cruise control systems, lane departure systems, lane-keeping systems, or other systems known in the art that perform threat assessment of detected objects within a vehicle environment.

Referring now to FIG. 1 where there is shown therein a perspective view of a front portion of a vehicle 10 having an impact mitigation system 20 in an extended position according to an exemplary embodiment of the present invention. The impact mitigation system 20 is included on a front end 30 of a sports utility vehicle. The front end 30 of the vehicle has a grill 40 or fascia and a hood 50 that define an engine compartment 60. The engine compartment 60 includes the vehicle's primary power source (not shown) such as an internal combustion engine, battery pack or fuel cell. Rearward of the engine compartment 60 there is a passenger cabin 70 where the driver and other passengers may sit. A roof structure 80 is shown covering the passenger cabin in FIG. 1.

Figure 2:
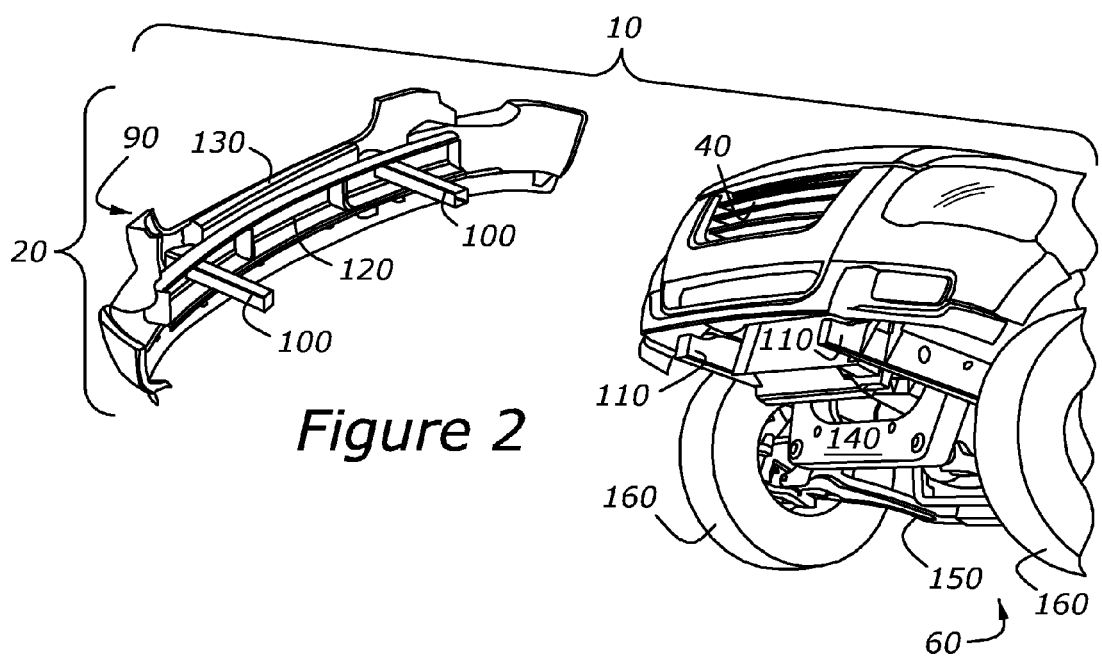
FIG. 2 is a perspective view of the vehicle of FIG. 1 with the front module detached from the vehicle.

Forward of the engine compartment is a front end module 90 that is movable with respect to the vehicle 10. The deployable front end module 90 is a brake induced active structure that utilizes the signal and momentum change induced by an electronic braking system (e.g. as shown and discussed with respect to FIG. 7). Under normal driving conditions an extendable rail 100, as shown in FIG. 2, resides within the main side rail 110 and the bumper 120 stays flush with the main rail. The front module 90 is initially constrained so that it cannot be deployed accidentally. When the electronic vehicle brake is applied, the front module 90 can be disengaged from the vehicle body. In the illustrated embodiment of FIG. 1, the front module 90 is shown in a disengaged or an extended position. Front module 90 includes a front fascia 130 formed to cover a bumper 120, as shown in FIG. 2; the bumper acts as a rigid structural member extending laterally across the front end 30 of the vehicle 10. Energy absorbing foam (or "E/A foam") can be incorporated into the front module 90 forward the bumper 120. In front crash scenarios, the bumper 120 can be one of the first vehicle components to collide with another vehicle or foreign object. For reasons, some of which are explained herein below, it is beneficial to have the bumper 120 extend forward or away from the vehicle 10 as shown in FIG. 1.

Referring to FIG. 2 where there is shown therein a perspective view of the vehicle 10 of FIG. 1 with the front module 90 detached from the vehicle. FIG. 2 illustrates the underside of the vehicle 10. The engine compartment 60 sits underneath the hood and behind the front fascia 130 and radiator. Underneath the engine compartment the vehicle chassis 140 is positioned. The engine can be attached to and rest on the chassis. The chassis 140 is partially shown in FIG. 2 and includes a front axle 150 extending between the two front wheels 160 of the vehicle 10. Two main rails 110 (or "side rails") are also a part of the vehicle chassis 140. Main rails 110 extend longitudinally across the vehicle or between the front end 30 and a rear end of the vehicle (not shown). In the illustrated embodiment, each main rail 110 is an extruded, hollowed beam formed of a metallic material such as steel or an aluminum alloy. As shown in FIG. 2, front module 90 is configured to move or slide with respect to the main rails 110. In addition to the fascia 130 and bumper 120, front module 90 includes two extendable rails 100 that are configured to mate with the main rails 110 and selectively move with respect to the main rails. Front module 90 is attached to the vehicle main rails 110 via a fastening system as is shown and discussed herein below with respect to FIG. 3. Still referring to FIG. 2, when the front module 90 is attached to the vehicle 10, extendable rails 100 fit inside of each of the main rails 110 and are configured to slide with respect to the main rails. While front module 90 can be utilized with a number of different propellants to move the module forward, the front module is spring mounted with respect to the vehicle 10 and configured to launch forward via the spring force when the module is detached from the vehicle.

Figure 3:
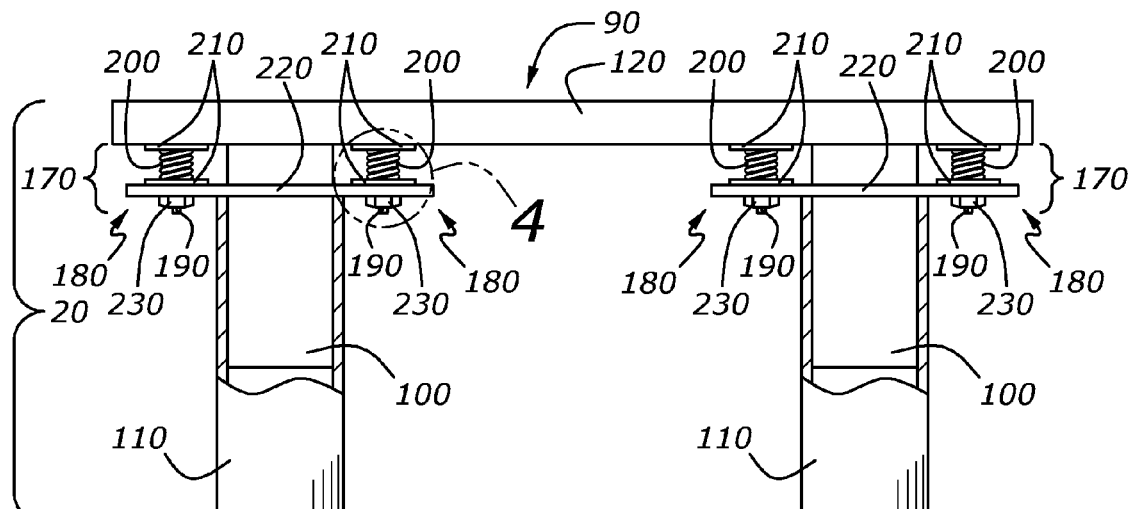
FIG. 3 is a side view of a fastening system for use with the impact mitigation system shown in FIG. 1.
Figure 4A:
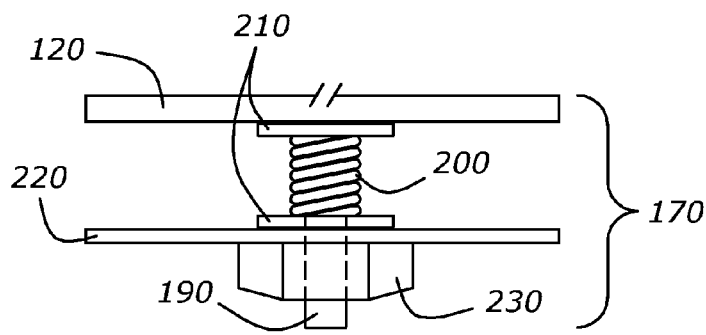
FIG. 4a illustrates a side view of the fastening system shown in FIG. 3, in the attached position, at section 4.

The spring-mounted configuration of the front module 90 is shown in FIG. 3. FIG. 3 is a side view of a fastening system 170 for use with the impact mitigation system 20 shown in FIG. 1. The fastening system 170 is configured to selectively attach the front module 90 to the main rails 110 as shown. In the illustrated embodiment, fastening system 20 includes four sets of nut-and-bolt assemblies 180. Bolts 190 are coupled to the bumper 120 at each respective location on the bumper. Bolts 190 are threaded at one end. A spring 200 is threaded onto bolt 190 between the bumper 120 and main rail 110. Washers 210 are positioned between the spring 200 and bumper 120 as well as between the spring 200 and flange 220. In the embodiment shown in FIG. 3, a nut 230 is attached to each end of the bolts 190 and the springs 200 therebetween are shown in compression. The springs 200 are compressed when the front module 90 is mounted on the main rail 110, as shown in FIG. 4a, inducing a compressive load. When the front module 90 is disengaged from the body, the compressive load present in the spring 200 induces an impulse. The impulse generated by a spring having a stiffness of 56 lbs/inch that is compressed 2 inches can extend the illustrated front module by 150 millimeters in about 58 milliseconds. Extra crush space provided by the extendable rail 100 which absorbs additional impact energy and softens the vehicle crash pulse as discussed with respect to the results graphed in FIG. 19.

Fastening system 170 attaches to the main rail 110 via flange 220 that is coupled to the main rail. Flange 220 includes an orifice through which bolt 190 can fit. The nut 230 screws onto the bolt 190 on the opposite side of the flange 220 as the bumper 120. Nut 230 can be unscrewed using an electric motor and rotary actuator. The extendable rails 100 are configured with a cross-sectional area that is less than the cross-sectional area of the main rail 110. Extendable rails 100 fit within the main rails 110 and can slide with respect to the main rails when the fastening system 170 releases the front module 90 from the main rail.

Figure 4B:
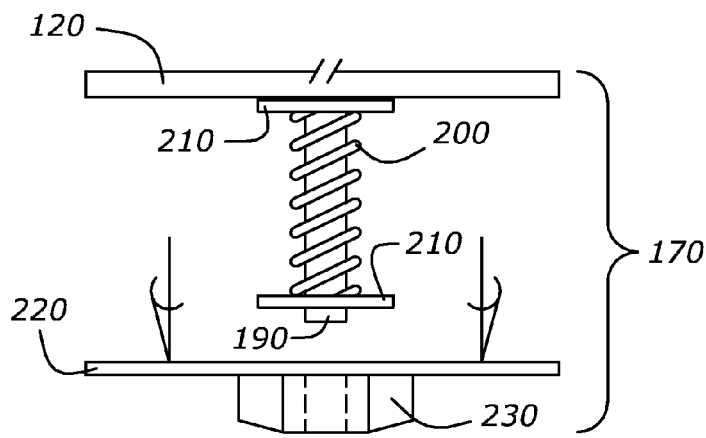
FIG. 4b illustrates a side view of the fastening system shown in FIG. 3, in the detached position, at section 4.

FIGS. 4a-b highlight the fastening system 170 of FIG. 3. FIG. 4a shows a side view of the fastening system 170 shown in FIG. 3 in the attached position at section 4. Spring compresses against flange 220. This allows the bumper 120 and flange 220 to come into contact, bolstering structural integrity. In this configuration bumper 120 is attached or fastened to the main rail 110. Bolt 190 is shown threaded through nut 230.

FIG. 4b illustrates a side view of the fastening system 170 shown in FIG. 3 in the detached position at section 4. Spring 200 extends from flange 220 is uncompressed. Spring 200 applies a force to the bumper 120 to move the bumper and front module 90 forward with respect to the vehicle. In this configuration bumper 120 is detached or unfastened from the main rail 110. Bolt 190 is released from the nut 230. In another embodiment, the bolt 190 is attached to the main rail 110 and nut 230 is attached to the bolt 190 through washer 210 on the bumper 120. The fastening system 170 is flexible in that connecting members can be positioned on any one of the front module 90 or main rail 110. When a crash event is avoided (or there has been a false alarm), the module 90 can be pushed back and locked in its initial position.

Figure 5:
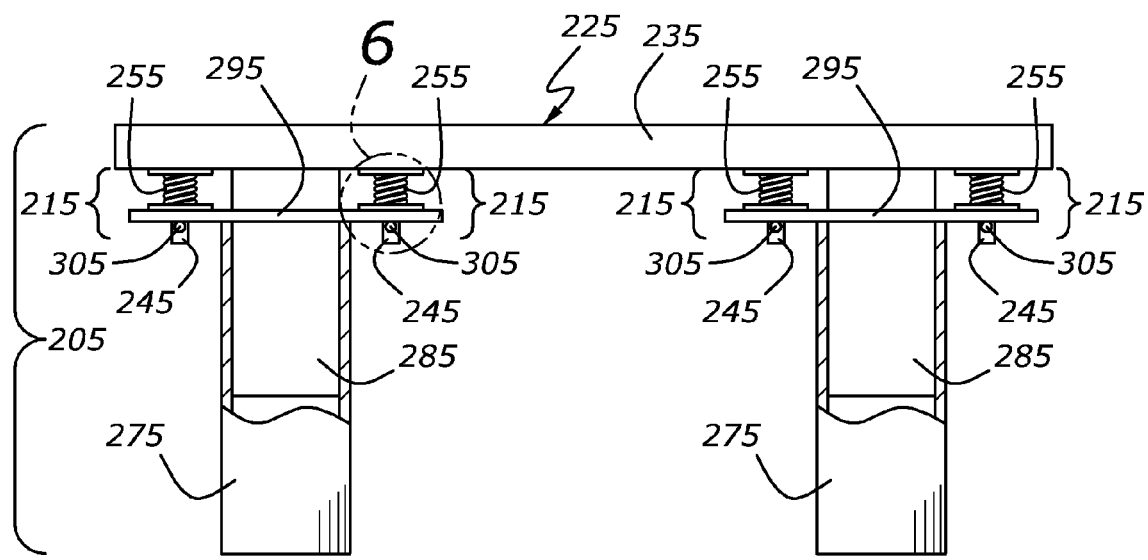
FIG. 5 is a side view of a fastening system for use with an exemplary impact mitigation system.
Figure 6A:
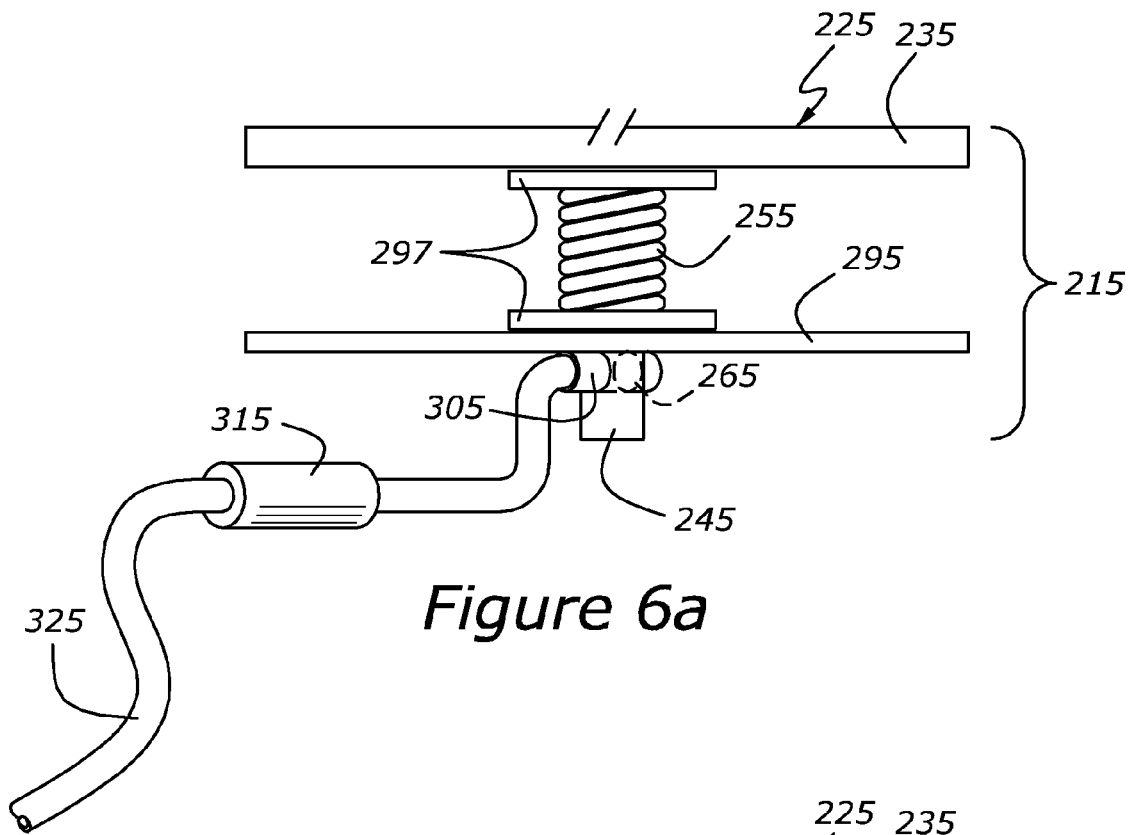
FIG. 6a illustrates a side view of the fastening system shown in FIG. 5, in the attached position, at section 6.
Figure 6B:
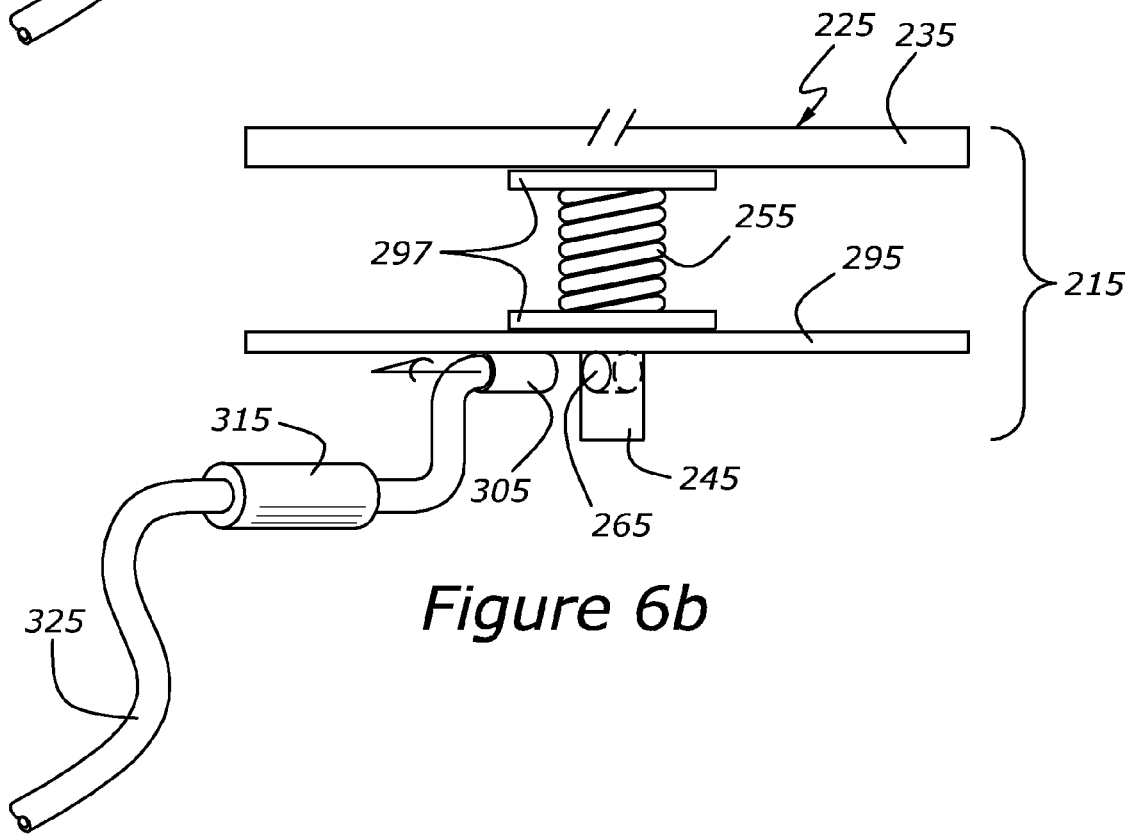
FIG. 6b illustrates a side view of the fastening system shown in FIG. 5, in the detached position, at section 6.
Figure 9:
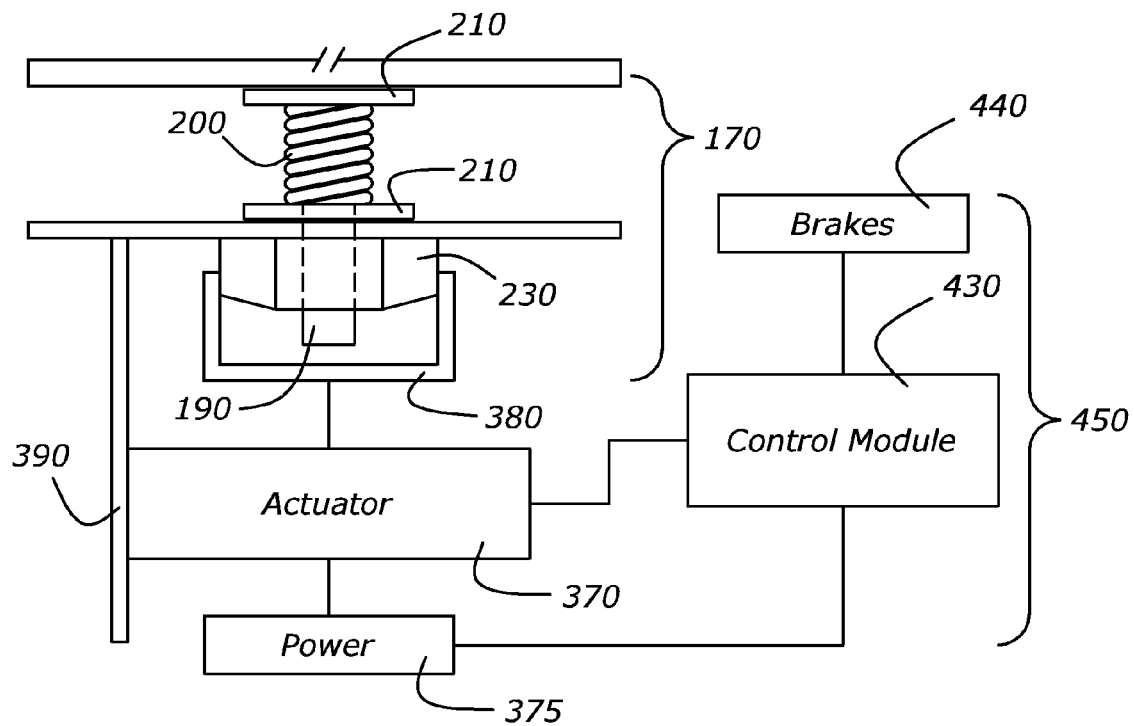
FIG. 9 illustrates an impact control module with an exemplary fastening system.

Referring to FIGS. 5-6b there is shown therein a side view of an impact mitigation system 205 with another exemplary fastening system 215. The fastening system 215, shown in FIG. 5, provides an alternative method of securing and disengaging a front end module 225. The front end module 225 is partially shown having a bumper 235. In this method, a bolt 245 holds compressed springs 255 in place when the bolt is passed through a hole 265 (or orifice) at an end of a main rail 275, as shown in FIG. 6a. An extendable rail 285 is configured to move with respect to the main rail 275. A bracket 295 is coupled to the main rail 275. The bolt 245 has a strategically placed hole 265 so that the hole just clears the bottom of bracket 295 (and washers 297) when the springs 255 are fully compressed. A locking pin 305 is then inserted through the hole 265 to secure the bolt 245 and the front module 225 in place. In this state the springs 255 remain fully compressed. The locking pin 305 is attached to a hydraulic actuator 315 that in turn is connected to an electronic braking system (e.g., 440 as shown in FIG. 9) having a brake fluid chamber. A check valve (not shown) separates the hydraulic line 325 connected to the actuator 315 from the hydraulic line connected to the brake fluid chamber. This prevents any activation of the actuator 315 under normal braking conditions.

When electronic braking is applied, the check valve opens up and hydraulic pressure is transmitted to the actuator 315 to unlock the pins 305, as shown in FIG. 6b. Removal of the pin 305 disengages the front end module 225 from the main rails 275 and alloys the compressed springs 255 to apply force to the front module for deployment. In this method the front module 225 can be easily re-secured in the case of false or accidental deployment. Though the pin 305 shown in FIGS. 5-6b is hydraulically actuable, in another embodiment, the pin 305 is electrically actuable. Pin 305 acts like a solenoid and is switched in and out of engagement according to a predetermined electric signal. Pin 305 can also by chemically or pyrotechnically actuated.

Figure 7:
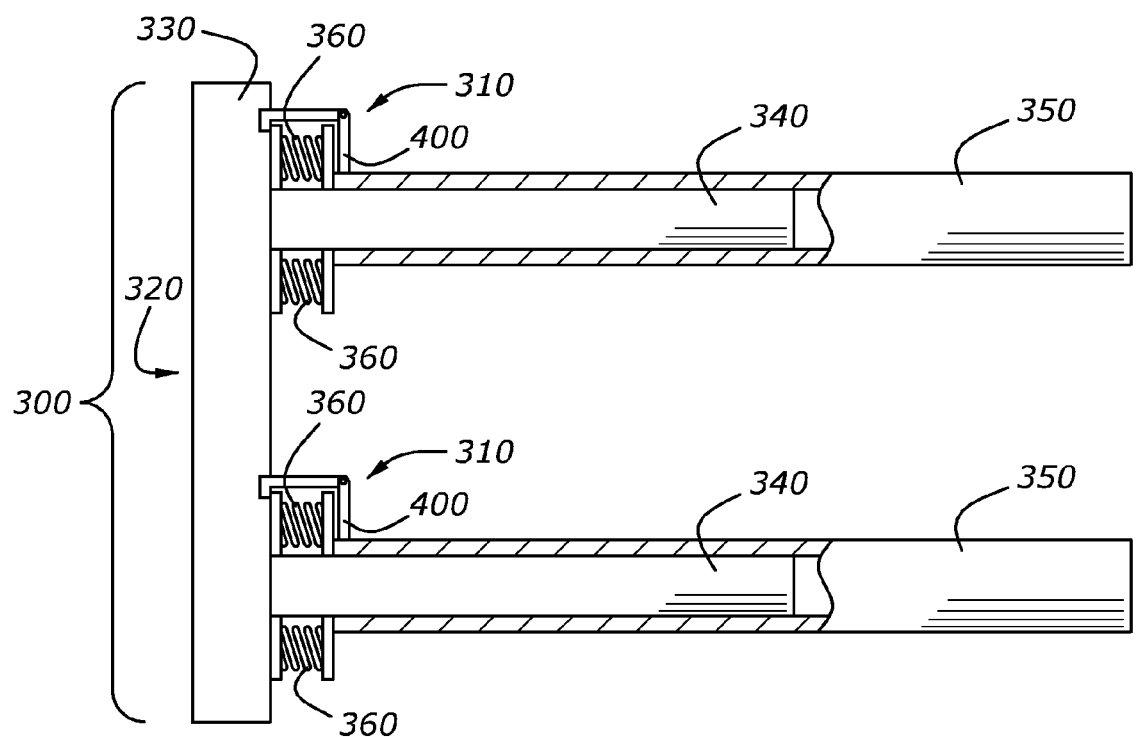
FIG. 7 is a side view of an impact mitigation system with pins, the system shown in the stowed position.
Figure 8:
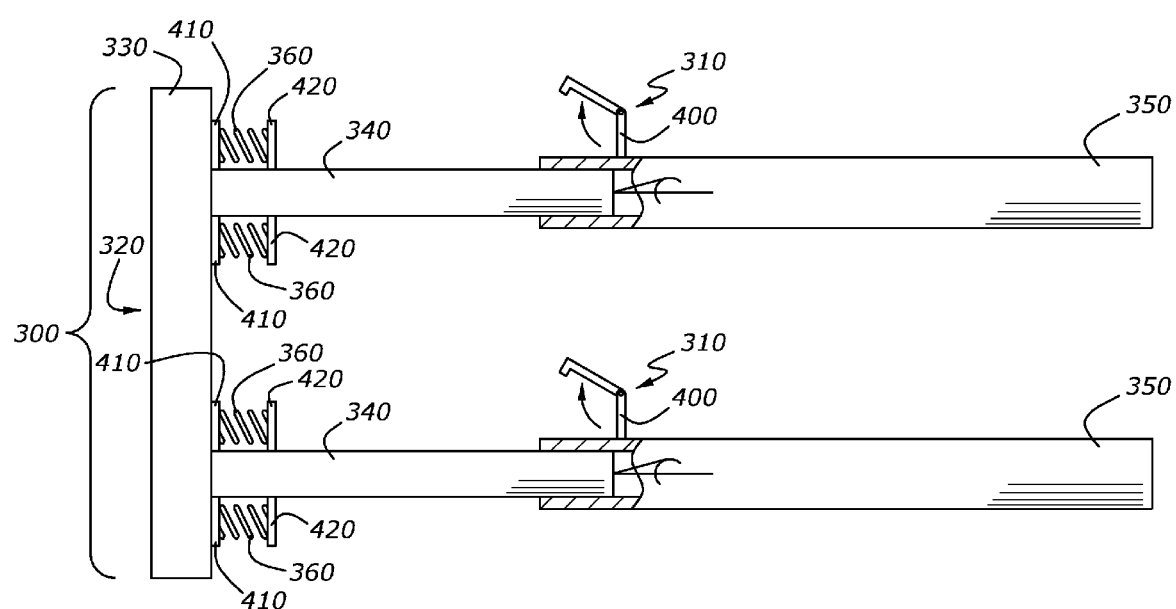
FIG. 8 is a side view of the impact mitigation system of FIG. 7 shown in the extended position.

Referring now to FIGS. 7-8, there is shown therein a side view of an impact mitigation system 300 with another exemplary fastening system 310. The impact mitigation system 300 is shown in the stowed position and extended position, respectively. The system 300 includes a front module 320 that is configured to extend away from the vehicle. Front module 320 includes a bumper 330. Front module 320 also includes two extendable rails 340 that are coupled perpendicularly with respect to the bumper 330. Rails 340 are spaced symmetrically with respect to the bumper 330. The front module 320 is spring-mounted with respect to two main rails 350 (or "side rails). Main rails 350 are structural rails that extend from the front of the vehicle to the end of the vehicle. Main rails 350 are hollowed at least at the front portion of the vehicle. Extendable rails 340 are configured to slide with respect to the main rails 350. In the shown embodiment, extendable rails 340 have a cross-section that is smaller than the cross-section of the main rails 350. Extendable rails 340 can fit within the front portion of the main rails 350. When front module 320 is deployed, extendable rails 340 move with respect to the main rails 350.

Front module 320 is detachable from the main rails 350 but in this configuration can easily be reset or reattached. Springs 360 are configured to apply a force to the front module 320 when the front module is detached from the main rail 350. Springs 360 are shown compressed in FIG. 7. When front module 320 detaches from vehicle, springs 360 apply a force proportional to the stiffness of the springs. In one embodiment, two springs having a stiffness of 60 lbs/inch and are compressed 2 inches, positioned between the front module and each main rail. In the shown embodiment, coil springs are utilized. In another embodiment, a leaf spring is used. Various springs or elastic members can be utilized to propel front module 320 forward in a predetermined manner. For example, a hydraulic spring or unit can be substituted for the spring. When front module 320 is detached from the main rail 350, the hydraulic spring applies a predetermined force to the module, thereby extending the module forward of the vehicle.

In the exemplary embodiment of FIGS. 7-8, the impact mitigation system 300 includes a fastener system 310. Fastener system 310 is configured to selectively attach the front module 330 to the main rail 350. An actuator 370, as shown in FIG. 9, is linked to the fastener system 310.

The fastening systems 170 and 310 are controlled by an actuator 370, as shown in FIG. 9. The actuator 370 includes a bracket 380 or socket wrench that is configured to mate with nut 230. Bracket 380 is attached to a drive screw that turns the bracket 380 and nut 230. Actuator 370 is powered by an electric motor. Actuator 370 can be mounted to a side bracket 390 that is positioned with respect to the vehicle chassis. In this manner, the actuator 370 is configured to control attachment of the front module 320 to the main rail 350.

In the shown embodiment of FIGS. 7-8, fastener system 310 includes a latch 400. Latch 400 acts as a latch securing a flange 410 on the front module 320 to the main rail 350. Latch 400 is hooked onto a front surface of the flange 410. Spring 360 is placed between the flange 410 and an opposing flange 420. Flange 420 abuts an end of the main rain 350. The force applied by the spring 360 is applied against the cross-section of the main rail 350. Latch 400 is configured to rotate from an attached to a detached position. When the latch 400 is in the detached position, as shown in FIG. 8, the front module 320 is detached from the main rail 350 and springs 360 thrust the front module 320 forward with respect to the vehicle. Spring 360 applies a force against the main rail 350, away from the vehicle. Extendable rails 340 are moved away from main rails 350. In this manner the entire front module 320 is extended forward with respect to the vehicle.

An actuator, e.g. such as 370 shown in FIG. 9, controls the opening and closing of latch 400. In one embodiment, latch 400 includes a solenoid that rotatably engages (for example, via a cam) the latches when the fastening system 310 is switched between the attached and detached positions. In another embodiment, a drive motor is utilized to turn the latch 400 into the desired position. Actuator 370 can be hard wired to the fastening system 310 or wirelessly linked to the fastening system. Bluetooth technology, configured to enable short-range communication between electronic devices, is utilized to enable the actuator to communicate with the fastening system wirelessly. Other wireless standards or technologies can be used with the impact mitigation system such as infrared systems, RF systems, IEEE standard 802.11 and other communications platforms.

Actuator 370 is linked to a control module 430. Control module 430 is configured to govern the actuator 370 and other vehicle components. In one embodiment, control module 430 is in communication with the restraint control module and also governs deployment of air bags as well as locking and retraction of seat belts. Control module 430 is linked to a vehicle braking system 440 and control actuator 370 according to a predetermined signal received from the braking system.

Control module 430 can be configured to govern actuation of the actuator 370 according to vehicle braking conditions in various manners. In one embodiment the control module 430 for the impact mitigation system is linked to the vehicle braking system 440 that is configured to send a predetermined signal to the control module to activate the actuator. A control circuit 450, either included within or inclusive of the control module 430, is configured to activate the actuator 370 according to the collision mitigation by braking system's control of the vehicle braking system 440. For example, some electronic brake systems rely on radar and can be activated when a crash is imminent. When the electronic braking system is activated, the driver loses control over the braking and a vehicle control module takes over. The vehicle braking system is responsive to computer-driven application of braking. Ultrasonic sensors are incorporated in the front fascia. An ultrasonic pulse is emitted from the front end of the vehicle to detect other vehicles or foreign objects. In one embodiment, the control module 430 is configured to detach the front module from the front end of the vehicle when an object is detected within 200 millimeters of the vehicle. In another embodiment, the control module 430 is configured to detach the front module from the vehicle when the rate of deceleration of the vehicle is greater than or equal to 0.7 Gs. Radar based algorithms are reliable in detecting imminent crash, therefore, the likely hood of accidental activation of the electronic braking is low. While the vehicle body is decelerating, the front module maintains its pre-braking velocity allowing it to extend relative to the body. After a pre-determined extension of the front end, the front module gets locked in the extended position.

The vehicle braking system 440 is an electric braking system. In this way the impact mitigation system is a brake induced active structure (or BIAS). Braking system includes a control circuit (e.g., 450 as shown in FIG. 9) that measures the performance of the brakes, whether brake application is manual or computer-driven, the speed of the vehicle, deceleration and other vehicle conditions. Such vehicle conditions can be determinants for actuation of the actuator and release of the front module from the front end of the vehicle. For example, in another embodiment, actuation of the actuator is conditioned upon the deceleration of the vehicle. The vehicle braking system includes an accelerometer to measure deceleration of the vehicle when the brakes are applied. Control module is configured to actuate actuator when the vehicle's deceleration is greater than or equal to 0.8 Gs. In another embodiment, the control module is configured to disable activation of the actuator when the vehicle's deceleration is less than 0.8 Gs. The front end module does not deploy during manual braking by the driver. In this embodiment, the control module will only activate the actuators when electronic braking is applied. In other words, the control module receives signal directly from the electronic braking system 440. To ensure this, the control module takes the input directly from the electronic braking system and never operates independently. For a hydraulic actuator system, the control module opens a check valve that connects the actuator's hydraulic line to the brake fluid chamber when a signal is received from electronic braking. This allows the pressure to propagate through the hydraulic line and activate the actuators to disengage the front end module. Deployment of the front end module and subsequent locking is achieved without any further intervention from the control module.

The module 430 can also be activated after a pre-determined lapse of time following activation of the electronic braking system. Average maximum deceleration achievable through braking can be limited by the friction that can be sustained between the tire and the road surface. The system is activated approximately 750 milliseconds before an impending crash event. Without the inclusion of the compressed springs, the front module can be extended by 150 millimeters in about 212 milliseconds when an average deceleration of the vehicle body is approximately 0.7 Gs. Since the electronic brake system is activated at 750 milliseconds before a crash, there is enough time to deploy the front module and lock it in the extended position. When the stored energy in compressed springs is used, the deployment of the front module can be accelerated significantly. In one embodiment having springs with stiffness of 56 lbs/inch and 2 inches of compression, the front end module extends the same distance in only 58 milliseconds after disengagement. It is, however, possible to further enhance the deployment rate of the front module using stiffer—or otherwise differently designed—springs.

Control module 430 may perform various different sensing system operations including adaptive cruise control, lane-keeping control, lane-departure control, window clearing control, collision avoidance control, countermeasure control, or other sensing system operations. The operations may be performed sequentially or simultaneously. The control module can have a driver input, by which the control module may perform path prediction as well as other tasks. Control module determines which of the sensing system operations to perform. The control module while performing one or more of the sensing system operations may determine whether to deploy the front module. Depending upon relative positions, velocities, and accelerations of the detected objects, the control module can also determine whether to indicate to the vehicle operator a potential collision or deploy the front module, as needed, so as to prevent a collision.

Control module 430 includes a microprocessor such as a computer having a central processing unit, memory (e.g., RAM and/or ROM), and associated input and output buses. The microprocessor can be application-specific integrated circuits or may be formed of other logic devices. The control module can be consolidated with the collision mitigation by braking system module, a central vehicle main control unit, an interactive vehicle dynamics module, a restraints control module, a main safety controller, other vehicle controllers or control module can be a stand-alone controller.

Different sensors can be utilized with the control module to assess circumstances ripe for front module deployment. In one embodiment, object detection sensors are utilized. Such sensors can be of various types and styles including vision-based, radar, light detection and ranging (or LIDAR), ultrasonic, active infrared, passive infrared, telematic, motion, or other object detection sensors. A vision-based sensor such as a camera, a charged-coupled device, an infrared detector, a series of photodiodes, or other vision sensor can be utilized with the impact mitigation system. The object detection sensors can also be utilized and configured to perform not only object detection, but also path prediction, target selection, target classification, as well as other known sensor tasks. Other exemplary sensors include vehicle status sensors that determine current vehicle status. Vehicle status sensors can include an accelerometer, yaw rate sensor, a velocity sensor, a transmission gear sensor, a throttle sensor, a brake sensor, a steering column position sensor and other vehicle status sensors.

In another exemplary embodiment, the vehicle braking system is hydraulic. Braking fluid is routed from a reservoir to a caliper in the brakes to selectively apply braking force to the wheels. In this configuration actuation of the actuator is conditioned upon a predetermined pressure signal received from the vehicle braking system. For example, if braking fluid is applied at a pressure of 100 psi or greater the actuator is actuated. Control module Is a hydraulic control module that includes a valve to selectively route braking fluid to the actuator. Actuator is activated using a hydraulic pressure delivered through tubing connected to the brake fluid chamber. Actuator includes a piston that selectively opens and closes the fastening system upon receiving braking fluid at a predetermined pressure signal. Upon actuation the fastening system detaches the front end module. This allows the compressed springs to apply load and deploy the front module. A power source 375 is linked to the control module 430 and is configured to apply a force to the front module when actuated. Power source 375 includes a hydraulic cylinder extending between the front module and main rail.

Figure 10:
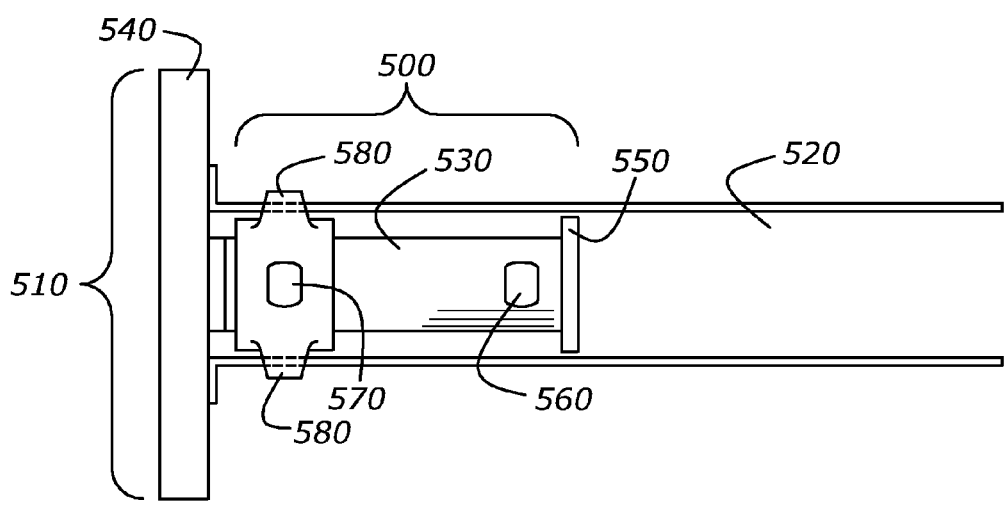
FIG. 10 is a side view of an impact mitigation system and locking mechanism according to another exemplary embodiment, the system shown in the stowed position.
Figure 11:
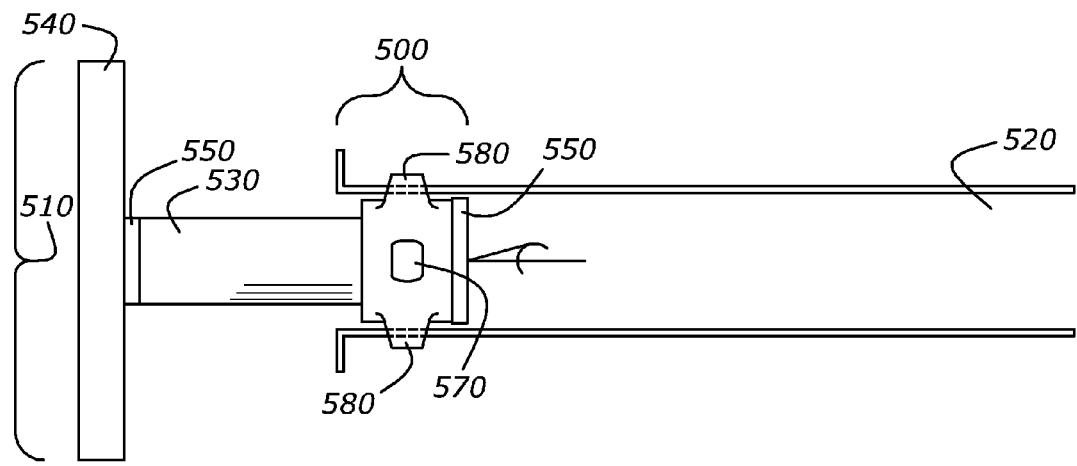
FIG. 11 is a side view of the impact mitigation system of FIG. 10 shown in the extended position.

Referring now to FIGS. 10 and 11, there is shown therein a locking mechanism 500 for use with an impact mitigation system 510. Locking mechanism 500 can be configured for use with the disclosed impact mitigation systems or with impact mitigation systems that are not discussed herein. Locking mechanism 500 is configured to restrain any extendable rail in an extended position after the front module is extended or deployed. FIG. 10 shows a side view of an exemplary impact mitigation system 510 in the stowed position having the locking mechanism 500 incorporated on the vehicle. As shown, main rail 520 is partially cut away to show the extendable rail 530 when nested in the main rail. A bumper 540 is perpendicularly connected to the extendable rail 530 through flange 550. A flange 550 is also attached on the opposing side of the extendable rail 530. Locking mechanism 500 includes a locking cavity 560 formed in the extendable rail 530. In the shown embodiment locking cavity 560 is a square-shaped orifice on the top surface of the extendable rail 530. Locking cavity 560 is configured to mate with a spring-loaded deadbolt 570 coupled to the main rail 520. Deadbolt 570 is attached to the main rail 520 via two brackets 580. Deadbolt 570 is biased towards the extendable rail 530. As the extendable rail 530 slides into an extended position the locking cavity 560 is positioned to engage the deadbolt 570, thereby securing the extendable rail 530 in position.

FIG. 11 is a side view of the impact mitigation system 510 of FIG. 10 shown in the extended position. Deadbolt 570 is depressed into the locking cavity 560. In this way, the position of the locking cavity 560 predetermines the length of extension for the bumper 540. For example, where an extension of 150 millimeters of the bumper 540 is desired, the location of the locking cavity 560 is 160 millimeters from flange 550. Bumper 540 is enabled to extend forward approximately 150 millimeters increasing the crash space in the front section of the vehicle. When in the locked position, bumper 540 is substantially prevented from moving toward the vehicle. Locking mechanism 500 serves as reinforcement for the bumper 540. Other vehicles and/or foreign objects that collide with the front end of the vehicle can be restricted from disturbing other components in the front end of the vehicle (e.g., an engine or radiator). Performance statistics of exemplary locking mechanisms (e.g., 500) are disclosed herein below with respect to FIG. 19.

Figure 12:
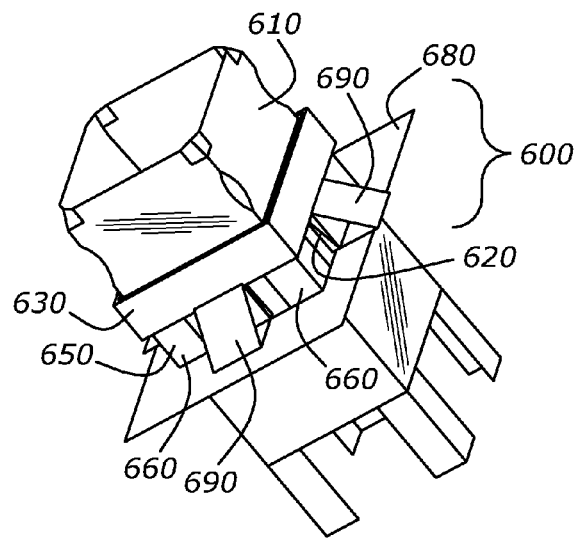
FIG. 12 is a perspective view of a locking mechanism according to another exemplary embodiment of the present invention, the rail shown in a stowed position.

Turning now to FIGS. 12-15, there is shown therein another exemplary locking mechanism 600. Locking mechanism 600 can be configured for use with the disclosed impact mitigation systems or with impact mitigation systems that are not discussed herein. Locking mechanism 600 is configured to restrain any extendable rail in an extended position after the front module is extended or deployed. FIG. 12 shows a locking mechanism 600 that can lock the front module against the main side rail after deployment so that the extendable rail can crush properly during impact. The extendable rail 610 partially resides inside the main side rail under normal driving condition. The front of the extendable rail 610 is attached to the bumper.

Locking mechanism 600, as shown in FIG. 12, includes four locking wedges 620 that engage a collar 630 at one end of the extendable rail 610 when the rail is in the extended position. The slidable collar 630 encircles the extendable rail 610. Collar 630 has a square orifice 640 with a cross-sectional area that is slightly larger than the cross-section of the extendable rail 610. Between the collar 630 and the extendable rail 610 sits a guide sleeve 650. Guide sleeve 650 includes a plurality of arms 660 as well as a plurality of locking wedges 620. Arms 660 are positioned at each corner of the guide sleeve 650. Between arms 660 are locking wedges 620 that are configured to pivot about an upper edge on guide sleeve 650, between an unlocked and locked position. In FIG. 12 the guide sleeve 650 has locking wedges 620 positioned outside an opening or orifice 670 in the sleeve. The orifice 670 in the guide sleeve 650 is such that the extendable rail 610 snugly fits through orifice, allowing the rail to move forward smoothly during deployment. The locking wedges 620 can be pushed inwards elastically when the extendable rail 610 clears the locking wedges 620 during deployment. In the shown embodiment, each wedge 620 is approximately 32 millimeters long and has a thickness of approximately 5 millimeters at the thickest location (i.e., the bottom surface of the wedge). The corner arms 660 of the guide 650 are attached to the main rail end plate or flange 680.

Figure 13:
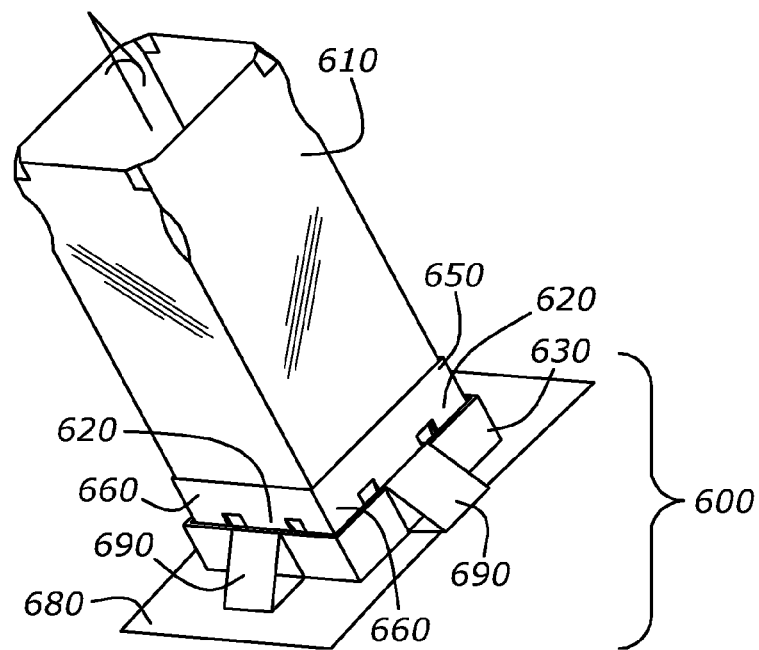
FIG. 13 is a perspective view of the locking mechanism of FIG. 12 with the rail shown in the extended position.

In FIG. 12, locking wedges 620 are shown in an unlocked position. Also provided on the locking mechanism 600 are a set of supporting wedges 690 that are fixed with respect to flange 680. Supporting wedges 690 provide structural support to the sliding collar 630 when it is slid around the guide sleeve 650. Slidable collar 630 fits between the supporting wedges 690 and the guide sleeve 650 when positioned around the guide sleeve. The collar 630 moves locking wedges 620 against the extendable rail and into engagement with flange 680, as shown in FIG. 13. When locking wedges 620 engage flange 680, extendable rail 610 is in an extended position.

Figure 14:
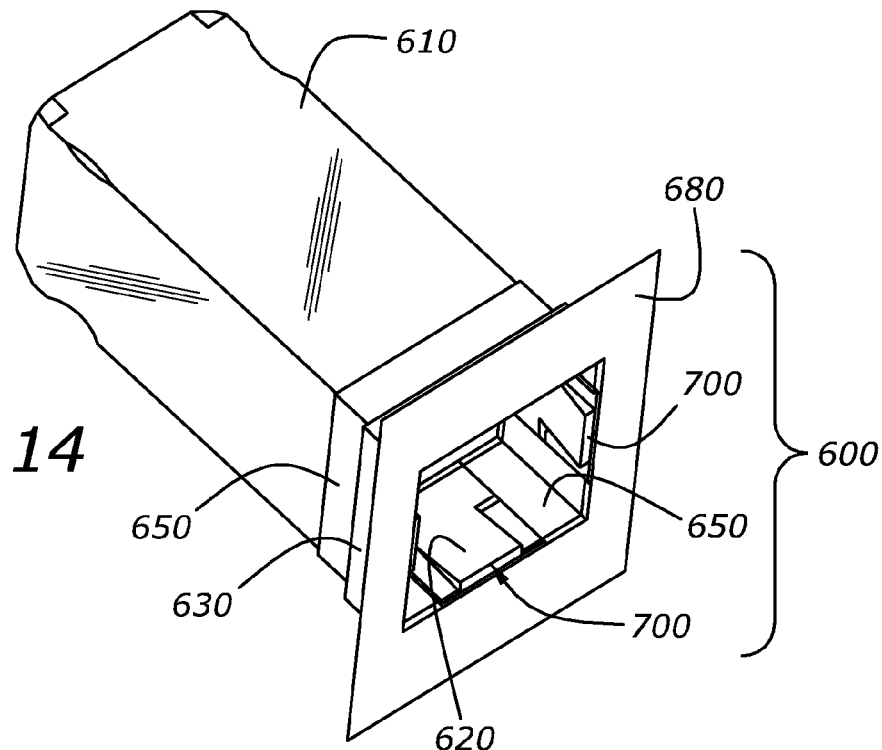
FIG. 14 is a bottom perspective view of the locking mechanism of FIGS. 12-13.

FIG. 14 shows the extendable rail 610 with the locking wedges 620 from a bottom perspective. Extendable rail 610 is extended and locked in place. Locking wedges 620 are positioned to abut the flange 680. Sliding collar 630 at least partially encircles the guide sleeve 650. Locking wedge 620 includes a bottom surface that has a larger cross-sectional area than the top surface of the locking wedge. Bottom surface 700 engages the flange 680 when the extendable rail 610 is extended. FIG. 14 shows a schematic of the new positions of locking wedges 620 after being pushed in by the sliding collar 630. In the event of an impact, the front module will be pushed in and the extendable rail 610 can attempt to move back into the main rail 710 through the guide opening 670. Since the guide opening 670 has now been narrowed by the new position of the locking wedges 620, bottom edges 700 of the extendable rail 610 will grind against them developing resistance due to friction. The frictional resistive force will increase with increasing push from the rail and can be substantial enough to completely stop the rail 610. This will allow the deployed front module, including the extendable rail, to crush properly absorbing additional impact energy. The locking wedges 620 are supported well during this phase provided by the sliding collar shown in FIG. 14.

Figure 15:
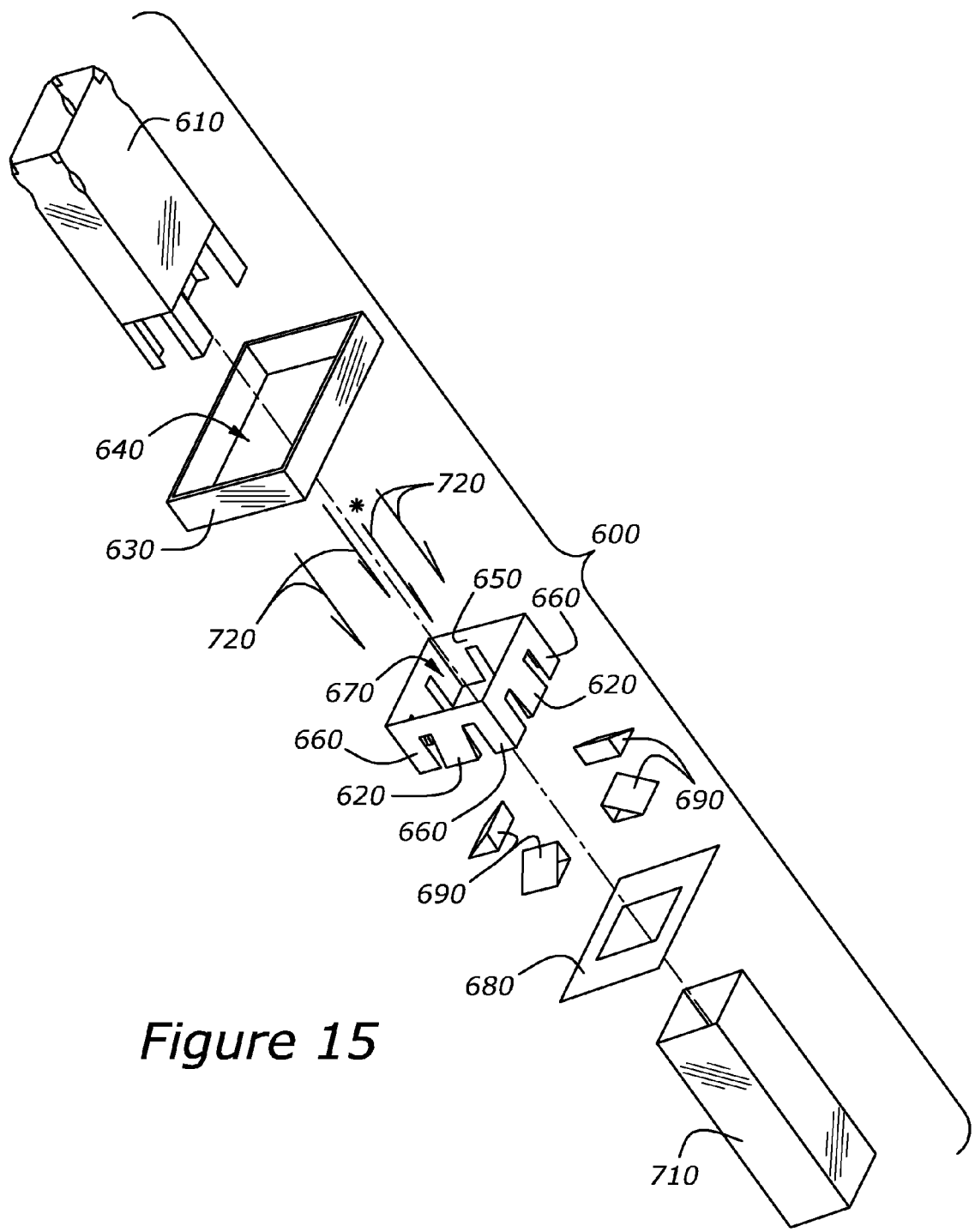
FIG. 15 is an exploded view of the locking mechanism of FIGS. 12-13.

FIG. 15 shows an exploded view of the locking mechanism 600 and extendable rail 610 disassembled. To assemble the extendable rail 610 and locking mechanism 600 a first end of the extendable rail fits in the sliding collar 630. Sliding collar 630 includes at least four cables 720 that are fixed to the collar. Cables 720 are configured to pull the collar 630 toward flange 680 when the extendable rail 610 is moved into the extended position. The length of cables 720 are pre-determined to limit the extension of the front end module. For example, if the module is desired to be extended by 150 mm at locking position, the cable 720 should be such that they allow the module to extend slightly more than 150 mm before the slidable collar 630 is activated. Besides activating the slidable collar 630, the cables 720 also function to hold the front end module so that it cannot detach from the main rail 710 and the vehicle body. Guide sleeve 650 fits within the sliding collar 630 and is positioned to abut the collar in a longitudinal direction. Supporting wedges 690 are affixed to the flange 680. The first end of extendable rail 610 is stowed in a main rail 710 when the locking mechanism 600 and rail 610 are assembled with respect to a vehicle. Extendable rail 610 is configured to slide away from the main rail 710 to mitigate vehicle impact. FIG. 15 shows a sliding collar 630 that snugly fits the upper part of the guide. A set of cables 720 are attached to the collar 630. The cables 720 are routed through small rings that are attached to main rail end flange 680 or to the main rail itself. The other ends of the cables 720 are attached to the top of the extendable rail 610 or the bumper. As the rail 610 extends forward it pulls the cables 720 with it, which in turn pulls down the sliding collar 630. The sliding collar 630 is stopped by the end plate 680 attached to the main rail 710 and locks in place due to a push pin type of mechanism that slides in a small hole in the end plate. FIG. 15 shows the locked position of the sliding collar 630 after a full extension of the rail 610. In this embodiment, the cables 720 are long enough to achieve the intended extension of the front module. As the sliding collar 630 is pulled down by the cables 720, the cables force the locking wedges 620 mounted on the guide 650 on all four sides to be pushed inwards by approximately 5 millimeters. This inward movement of the locking wedges 620 is sufficient to secure the extendable rail 610 in place so that the rail will deform during frontal impact.

In the shown embodiment of FIGS. 12-15, the locking mechanism 600 is configured to lock the front module against the main rail 710 after deployment so that the extendable rail can crush properly during impact. Though the illustrate embodiments of FIGS. 12-15 four locking wedges 620 are included on the guide sleeve 650 more or fewer wedges can be incorporated on the guide sleeve to accomplish the locking feature. In the shown embodiment, each wedge is approximately 38 millimeters long and has a thickness of approximately 10 millimeters at the thickest location (i.e., the bottom surface of the wedge 620). The corner arms 660 of the guide 650 are attached to the main rail end flange 680. In one embodiment, an additional set of supporting wedges 690 are welded to the main rail end flange 680 and function to prevent out board bending of the sliding collar 630, as shown in FIG. 15 which shows the how these wedges are supporting the sliding collar during the locking phase.

Figure 16:
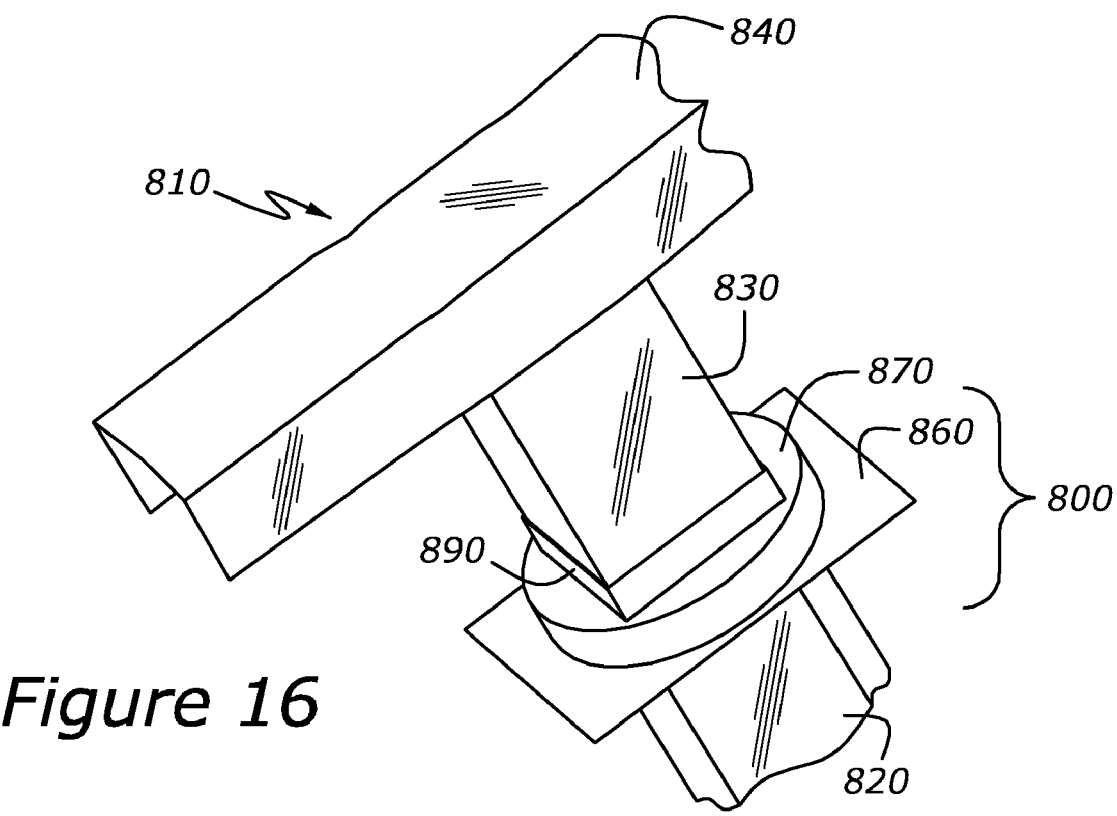
FIG. 16 is a perspective view of a front end module with locking mechanism according to another exemplary embodiment of the present invention.
Figure 17:
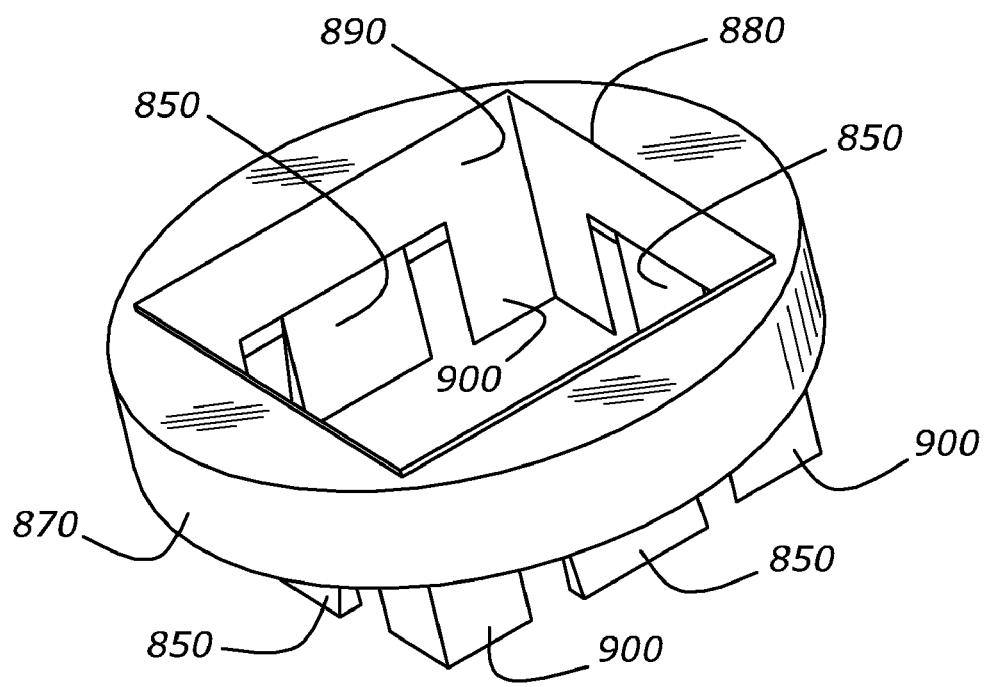
FIG. 17 is a perspective view of the locking mechanism of FIG. 16 with the locking wedges disengaged.
Figure 18:
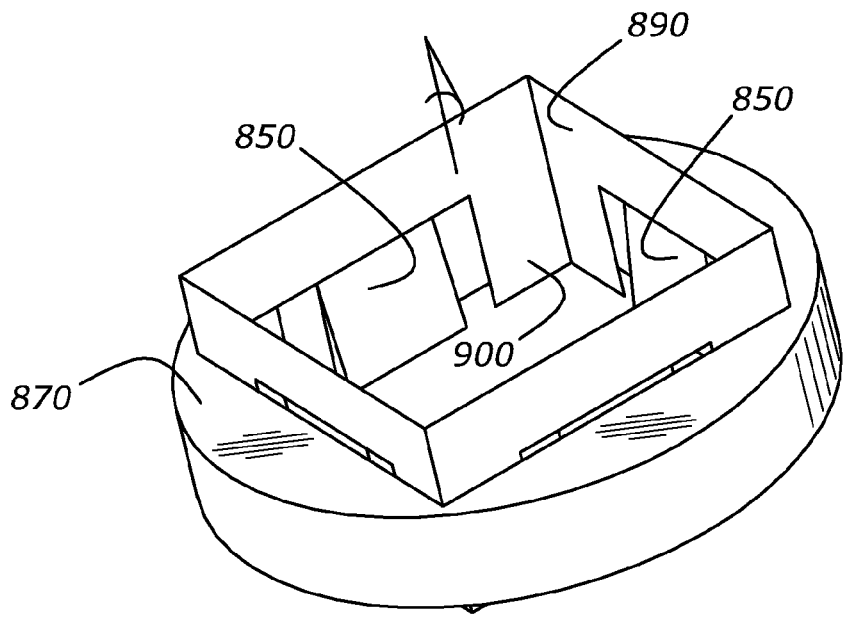
FIG. 18 is a perspective view of the locking mechanism of FIGS. 16 and 17 with the locking wedges engaged.

Referring now to FIGS. 16-18, there is shown therein another exemplary embodiment of yet another locking mechanism 800. Locking mechanism 800 can be configured for use with the disclosed impact mitigation systems or with impact mitigation systems that are not discussed herein. Locking mechanism 800 is configured to restrain any extendable rail in an extended position after the front module is extended or deployed. FIGS. 16-18 show a locking mechanism 800 that can lock the front module 810 against the main rail 820 after deployment so that the extendable rail 830 can crush properly during impact. The extendable rail 830 partially resides inside the main rail 820 under normal driving condition. The front of the extendable rail 830 is attached to the bumper 840.

Locking mechanism 800, as shown in FIG. 16, includes four locking wedges 850 that engage a plate 860 at one end of the extendable rail 830 when the rail is in the extended position. A stationary collar 870 encircles the extendable rail 830. Collar 870 has a circular cross-section with square orifice 880 therein. The cross-sectional area of the orifice 880 is slightly larger than the cross-section of the extendable rail 830. Between the collar 870 and the extendable rail 830 sits a guide sleeve 890. Guide sleeve 890 includes a plurality of arms 900 as well as a plurality of locking wedges 850. Arms 900 are positioned at each corner of the guide sleeve 890. Between arms 900 are locking wedges 850 that are configured to pivot about an upper edge on guide sleeve 890, between an unlocked and locked position. In FIG. 12 the guide sleeve 890 has locking wedges 850 positioned outside an opening or orifice in the sleeve. The orifice in the guide sleeve 890 is such that the extendable rail snugly fits through orifice, allowing it to move forward smoothly during deployment. The locking wedges 850 can be pushed inwards elastically when the extendable rail clears them during deployment.

Stationary collar 870, as shown in FIGS. 16-18, provide structural support to the guide sleeve 890. When locking wedges 850 engage flange extendable rail 830 is in an extended position.

To assemble the extendable rail 830 and locking mechanism 800, shown in FIG. 16, a first end of the extendable rail fits in the collar 870. Guide sleeve 890 fits within the collar 870 and is positioned to abut the collar in a longitudinal direction. The collar 870 is affixed to the flange or plate 860. The first end of extendable rail 830 is stowed in a main rail 820 when the locking mechanism 800 and rail 830 are assembled with respect to a vehicle. Extendable rail 830 is configured to slide away from the main rail 820 to mitigate vehicle impact. FIG. 17 shows that the collar 870 that snugly fits the upper part of the guide sleeve 890. FIG. 18 shows the locked position of the wedges 850 after a full extension of the rail 830.

In the shown embodiment of FIGS. 16-18 the locking mechanism is configured to lock the front module 810 against the main rail 820 after deployment so that the extendable rail 830 can crush properly during impact. Though the illustrate embodiments of FIGS. 16-18 four locking wedges 850 are included on the guide sleeve 890 more or fewer wedges can be incorporated on the guide sleeve to accomplish the locking feature. In one embodiment, only two supporting wedges are welded to the main rail end plate and function to prevent out board bending of the sliding collar.

Structural components of the impact mitigation system and locking mechanisms, including, for example, the bumper, extendable rail, main rail, springs, fastening systems, pins, latches, deadbolts, guide sleeves, collars and locking wedges, are composed of metal. Suitable metals can include steel, aluminum alloys, or titanium alloys. Polymers can also be substituted for metal in the manufacture of the structural components. Said components can be formed using a variety of techniques, e.g., extrusion, die casting or stamping. Components can be attached or coupled using any number of attachment techniques, such as for example, welding, press-fitting, molding, or using fasteners.

Figure 19:
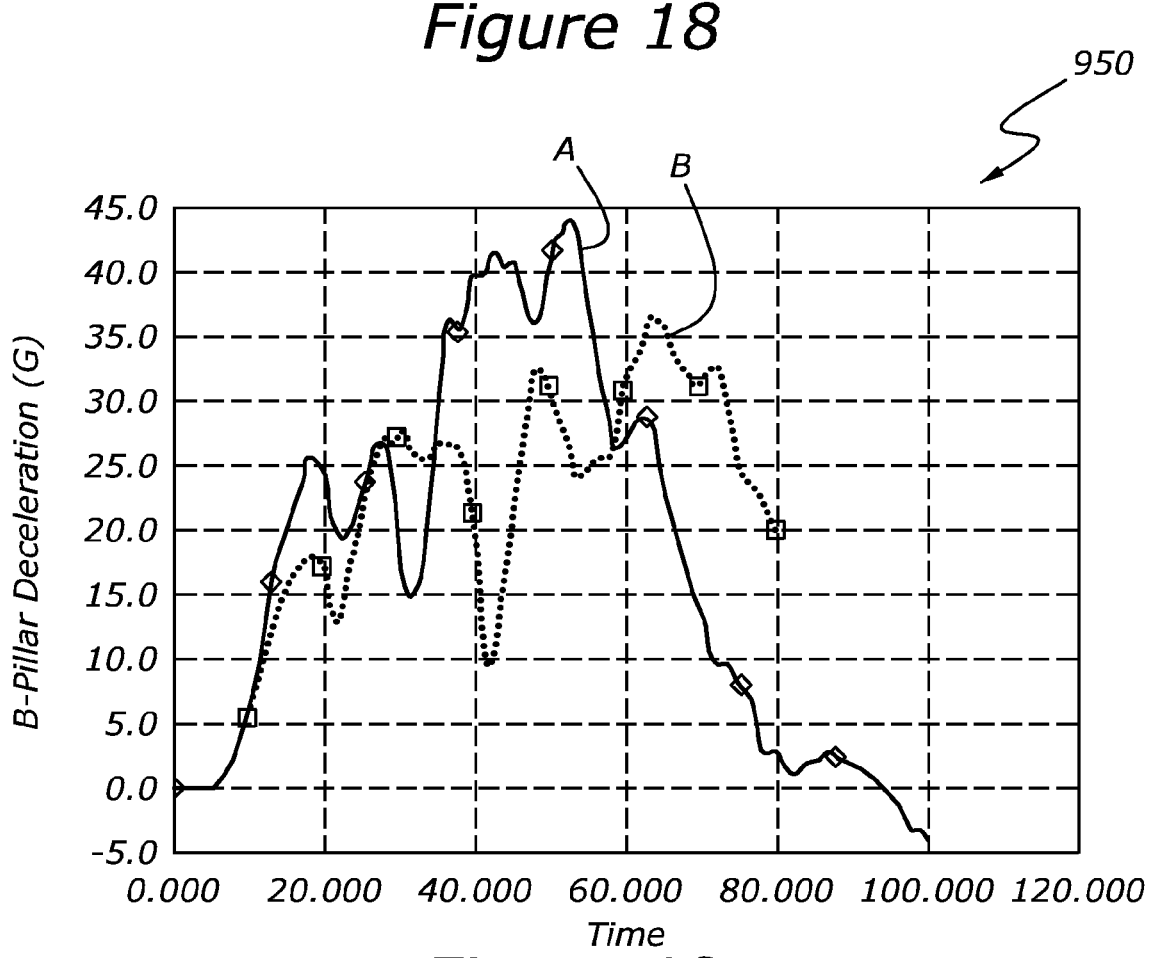
FIG. 19 illustrates empirical data on a vehicle impact mitigation system according to an exemplary embodiment of the present invention.

Referring now to FIG. 19, there is shown therein a graph 950 of the crash-pulse comparison for a full vehicle with and without an extendable front end module, thus showing a performance pattern for an exemplary extendable rail as observed in the simulation. To accomplish this, a CAE model was developed for a full vehicle with a deployable front end module having a locking mechanism according to one exemplary impact mitigation system. The extendable front module includes a front fascia, bumper foam, bumper beam and a 200 mm long extendable rail. A component level CAE simulation has confirmed the effectiveness of the locking mechanism prior to full vehicle CAE simulation. As shown, the locking mechanism, was surprisingly able to hold the rail in place and allow it to crush properly. FIG. 19 shows the crash pulse comparison obtained from the full vehicle frontal impact simulations at 35 mph. Line A represents the crash pulse (deceleration vs. time history during impact) of a full vehicle without extendable front end module as obtained from CAE analysis. Line B represents a crash pulse for the same vehicle with 150 mm additional crash space generated by the extendable front end module. As evident from the graph 950 of FIG. 19, the average deceleration is reduced by about 10 Gs due to the additional availability of crash space provided by the impact mitigation system.

Though the illustrated embodiments show the impact mitigation system used in the context of front impact, the impact mitigation system and locking mechanisms can be configured to mitigate, side, rear, overhead, and bottom impact situations. Instead of spring-mounting the front module a side module, for example, is biased with respect to the side of the vehicle. Similar actuators and fastening systems can be utilized to detach the side module. Mitigation systems can rely on a vehicle braking system or other vehicle systems to actuate deployment and still be within the scope of the present invention.

The various exemplary embodiments provide methods and systems for mitigating vehicle impact. Some embodiments of the present invention can be used in automobiles of various types to predict or determine whether a rollover or crash event will occur or is occurring. Some embodiments can use an algorithm to deploy and/or reset, or activate and de-activate, one or more systems upon predicting (or sensing) a front impact event to a given certainty. The impact mitigation systems can be reset automatically, manually, or both, allowing for example a manual override if automatic resetting is unsuccessful.

One or more of these impact mitigation systems can be used in the various exemplary embodiments of the present teachings and a control circuit can be adapted to activate these systems at the same time or at different times as thresholds are met, e.g., a threshold signifying entry of the vehicle into frontal impact. Various other sensors and separate controllers can also be used in some embodiments to control the impact mitigation system. Control circuit can deploy the front module by generating one or more control signals in response to multiple impact detection thresholds.

It will be apparent to those skilled in the art that various modifications and variations can be made to the methodologies of the present disclosure without departing from the scope of its teachings. Other embodiments of the invention will be apparent to those skilled in the art from consideration of the specification and practice of the teachings disclosed herein. It is intended that the specification and examples be considered as exemplary only.

While the best modes for carrying out the invention have been described in detail, those familiar with the art to which this invention relates will recognize various alternative designs and embodiments for practicing the invention within the scope of the appended claims.

I claim:

1. A control circuit for controlling vehicle components in impact conditions, the circuit comprising:
    an actuator configured to control attachment of a spring-mounted front module to a vehicle;
    a hydraulic cylinder configured to apply a force to the front module when actuated; and
    a control module linked to a vehicle braking system, configured to control the actuator and the hydraulic cylinder according to vehicle braking conditions.

2. The control circuit of claim 1, wherein the vehicle braking system includes a collision mitigation by braking system configured to selectively control vehicle braking;
    wherein the control module is configured to activate the actuator according to a collision mitigation by braking system signal.

3. The control circuit of claim 1, wherein the control module is configured to supply a vehicle braking fluid from the vehicle braking system to the actuator.

4. A vehicle, comprising:
    a front module configured to move away from the vehicle in anticipation of a vehicle impact;
    a fastening system configured to selectively attach the front module to a vehicle structural member;
    a crash control module configured to deploy the front module under a predetermined condition; and
    a vehicle braking system linked to the crash control module;
    wherein the predetermined condition is a vehicle braking condition;
    wherein the crash control module is configured to supply a vehicle braking fluid to the fastening system to actuate the fastening system when the predetermined condition is met.

5. The vehicle of claim 4, wherein the predetermined condition is a computer-driven application of braking force.

6. The vehicle of claim 4, wherein the front module is spring mounted with respect to the vehicle in a manner to move the front module away from the vehicle when the front module is detached from the vehicle.

7. The vehicle of claim 4, wherein the crash control module includes a hydraulic circuit having a hydraulic cylinder configured to apply a force to the front module when actuated.

8. The vehicle of claim 4, further comprising:
    a locking mechanism configured to hold the front module in a deployed position once deployed.

9. A vehicle impact mitigation system, comprising:
    a main rail;
    an extendable rail configured to move with respect to the main rail;
    a front module attached to the extendable rail;
    a spring between the front module and main rail, the spring configured to apply a force to the front module when the front module is detached from the main rail;
    a fastener system configured to selectively attach the front module to the main rail;
    wherein the fastener system includes a nut and bolt;
    wherein one of the nut or bolt is coupled to the front module and the other nut or bolt is positioned with respect to the main rail;
    wherein the nut and bolt are configured so that unscrewing the nut from the bolt detaches the front module from the main rail;
    an actuator configured to control the fastener system; and
    a locking mechanism configured to restrain the extendable rail in an extended position after the front module is deployed, the locking mechanism including either: (i) a locking cavity formed in the extendable rail and a spring-loaded deadbolt configured to engage the locking cavity; or (ii) a guide sleeve on the extendable rail having at least one locking wedge that abuts a rigid plate when moved into a locking position.

10. The system of claim 9, further comprising:
    a control module linked to the actuator and other vehicle systems wherein the control module is configured to govern the actuator.

11. The system of claim 10, wherein the control module is linked to an electric vehicle braking system and configured to actuate the actuator upon receiving a predetermined signal from the vehicle braking system.

12. The system of claim 11, wherein the vehicle braking system includes a collision mitigation by braking system and the predetermined signal relates to a computer-driven application of braking force.

13. The system of claim 10, wherein the control module is linked to a hydraulic vehicle braking system and wherein the control module is configured to actuate the actuator by providing a predetermined pressure signal to the actuator.

14. The system of claim 10, further comprising:
    a power source linked to the control module, the power source configured to apply a force to the front module when actuated.

15. The system of claim 14, wherein the power source is a hydraulic cylinder.

16. The system of claim 1, further comprising a slidable collar configured to move the locking wedge into the locking position when the slidable collar is positioned around the guide sleeve.

17. The system of claim 16, further comprising a plurality of cables attached to the slidable collar, the cables configured to guide the collar around the guide sleeve.

18. The system of claim 1, further comprising a stationary collar configured to move the locking wedge into the locking position when the stationary collar is positioned around the locking wedge.

19. The system of claim 18, wherein the stationary collar is a disc.

* * * * *